United States Patent
Vincent

(10) Patent No.: US 11,873,406 B2
(45) Date of Patent: Jan. 16, 2024

(54) BITUMINOUS COMPOSITION SOLID AT AMBIENT TEMPERATURE

(71) Applicant: TOTAL MARKETING SERVICES, Puteaux (FR)

(72) Inventor: Régis Vincent, Grigny (FR)

(73) Assignee: TOTAL MARKETING SERVICES, Puteaux (FR)

( * ) Notice: Subject to any disclaimer, the term of this patent is extended or adjusted under 35 U.S.C. 154(b) by 150 days.

(21) Appl. No.: 17/296,410

(22) PCT Filed: Dec. 6, 2019

(86) PCT No.: PCT/EP2019/083969
§ 371 (c)(1),
(2) Date: May 24, 2021

(87) PCT Pub. No.: WO2020/120313
PCT Pub. Date: Jun. 18, 2020

(65) Prior Publication Data
US 2022/0017749 A1 Jan. 20, 2022

(30) Foreign Application Priority Data
Dec. 10, 2018 (EP) .................... 18306652

(51) Int. Cl.
| | | |
|---|---|---|
| *C08L 95/00* | (2006.01) | |
| *C08K 5/20* | (2006.01) | |
| *C08K 5/25* | (2006.01) | |
| *D06N 5/00* | (2006.01) | |
| *E04D 1/20* | (2006.01) | |

(52) U.S. Cl.
CPC ............ *C08L 95/00* (2013.01); *C08K 5/20* (2013.01); *C08K 5/25* (2013.01); *D06N 5/003* (2013.01); *E04D 1/20* (2013.01); *C08L 2555/10* (2013.01); *C08L 2555/20* (2013.01)

(58) Field of Classification Search
CPC ....................................... C08L 95/00
See application file for complete search history.

(56) References Cited

U.S. PATENT DOCUMENTS

| | | |
|---|---|---|
| 2017/0226320 A1 | 8/2017 | Mariotti et al. |
| 2019/0241743 A1 | 8/2019 | Gauthier et al. |
| 2019/0248705 A1 | 8/2019 | Mouazen |
| 2019/0359526 A1 | 11/2019 | Hung et al. |
| 2019/0382583 A1 | 12/2019 | Vincent |

FOREIGN PATENT DOCUMENTS

| | | |
|---|---|---|
| WO | 2018/193210 A1 | 10/2018 |
| WO | 2018/193211 A1 | 10/2018 |

OTHER PUBLICATIONS

Jan. 22, 2020 International Search Report issued in International Patent Application No. PCT/EP2019/083969.
Jun. 8, 2021 International Preliminary Report on Patenbility issued in International Patent Application No. PCT/EP2019/083969.

*Primary Examiner* — Arrie L Reuther
(74) *Attorney, Agent, or Firm* — Oliff PLC

(57) ABSTRACT

A bituminous composition comprising at least one bitumen base, at least one compound of general formula (I): $Ar_1-R_1-Ar_2$ (I), and at least one compound of general formula (II): $R_2-(NH)_n CONH-X-(NHCO)_p(NH)_n-R'_2$ (II). The invention also concerns a process for the preparation of said bituminous composition.

12 Claims, No Drawings

BITUMINOUS COMPOSITION SOLID AT AMBIENT TEMPERATURE

The invention is directed to a bituminous composition which is solid at ambient temperature, notably at high ambient temperature. The invention also relates to a process for the preparation of such a bituminous composition. The bituminous composition according to the invention is suitable as binder or coating, notably for the preparation of asphalt shingles.

STATE OF THE ART

Roofing materials, such as shingles, are installed on the roof of buildings to give the roof an aesthetically pleasing appearance, but most of all to provide them protection from the elements and bad weather. Typically, the roofing material is constituted of a substrate such as glass fiber mat or an organic felt, an asphalt coating on the substrate, and a surface layer of protective and/or decorative granules embedded in the asphalt coating.

A common method for the manufacture of asphalt shingles is the production of a continuous sheet of asphalt material cut into individual shingles. In the production of asphalt sheet material, either a glass fiber or an organic felt mat is passed through a coater containing a hot liquid asphalt to form a tacky, asphalt coated sheet. Subsequently, the hot asphalt coated sheet is passed beneath one or more granule applicators, which discharge protective and decorative surface granules onto portions of the asphalt sheet material.

Asphalt materials used for the preparation of shingles are prepared from very hard bitumen bases, typically having a ring and ball softening point superior or equal to 80° C., preferably superior or equal to 90° C. The softening point of the bitumen base is an important parameter for the preparation of shingles. Bitumen bases with high softening points prevent and/or avoid melting problems which may be caused by extreme climate conditions, notably by high ambient temperatures. Such hard bitumen compositions are generally obtained by hardening, notably by oxidation, of bitumen bases. However, very few oil flows currently exploited in the world are capable of providing crude oil which, after refinement and oxidation processes, give access to bitumen bases having such grades. In addition, the availability of oxidized bitumen bases suitable for shingle applications is in constant decrease.

To compensate for this lack of raw material, the flows supplying the oxidation chambers are more and more mixed with road bitumen bases which may be modified with polymers and/or other hardening agents in order to modify the properties of the oxidized bitumen material.

Oxidized asphalt is generally applied at elevated temperatures (often roughly 400° F.~205° C.) and, due to a phenomenon known as "blow loss," about 1.0 to 5.0 wt. % of the raw material is lost during the oxidation process. Additionally, oxidized coatings can be very viscous and thus difficult to apply to a glass mat during shingle production. Furthermore, shingles made with oxidized coatings tend to have low impact resistance.

Another main problem is the recycling of asphalt shingles. About 11 million tons of shingles are disassembled every year in the United States alone. However, only a small part of the recovered bituminous material is currently recycled, notably as road binder for the preparations of bituminous mixes. The difficulty in recycling asphalt shingles is essentially due to the very high oxidation degree of the bituminous material which affects the durability of the road, notably the fatigue resistance and the crack resistance of the obtained road material at low temperature.

Therefore, there is the need for a bituminous material which is suitable for the preparation of asphalt shingles and which may be prepared from any bitumen base.

In particular, there is the need for a bituminous material which is suitable for the preparation of asphalt shingles and which can be prepared from a non-oxidized bitumen base.

There is also the need for a recyclable bituminous composition suitable for use as a shingle coating in the preparation of shingles.

U.S. Pat. No. 7,918,930 discloses the preparation of bituminous compositions comprising at least one blowing additive of general formula $Ar_1$—R—$Ar_2$.

WO 2008/107551 teaches the reversible reticulation of bitumen compositions based on the use of organogelator additives. The obtained bituminous compositions have a penetrability, measured at 25° C., of from about 40 to 70 1/10 mm.

WO 2018/115729 discloses a binder composition, notably a bituminous composition, comprising at least one acid compound of general formula R—(COOH)z and at least one amide compound of general formula R'—(NH)$_n$CONH—(X)$_m$—(NHCO)$_p$—(NH)$_n$—R".

None of these documents discloses bituminous compositions comprising the association of the two additives as defined here-after.

The applicant has surprisingly discovered a new bituminous composition which is solid at room temperature and which can be used for the preparation of asphalt shingles. The bituminous composition should be solid at room temperature such that it does not flow.

When the bitumen is in divided form, this could result in bitumen units sticking together. It is important that a balance be struck between reducing bitumen units sticking and producing a bitumen that has satisfying mechanical properties.

The bituminous composition according to the invention is advantageous in that it can be prepared from any bitumen base, in particular from oxidized and/or non-oxidized bitumen bases.

The invention is particularly remarkable in that it provides compositions comprising non-oxidized bitumen bases which are suitable for roofing applications, whereas the skilled professional usually considers that non-oxidized bitumen bases are non appropriate for such applications, unless otherwise modified, such as with the use of polymers.

Moreover, the Applicant has discovered that this new bituminous composition has equivalent, and even improved, physical properties, as compared to oxidized bitumen bases.

In particular, the bituminous composition according to the invention has an improved compressive strength, an increased ring and ball softening point, a reduced hot viscosity and a lower deformability as compared to oxidized bitumen bases.

Otherwise, the bituminous composition according to the invention is advantageous in that it can be fully or partially recycled as road binder.

SUMMARY OF THE INVENTION

The invention is directed to a bituminous composition comprising at least:
a) a bitumen base,
b) a compound of general formula (I):

$$Ar1\text{-}R_1\text{—}Ar_2 \qquad (I)$$

wherein:
Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more $C_1$-$C_{20}$ alkyl groups, and
$R_1$ represents an optionally substituted hydrocarbon divalent radical, the main chain of which comprises from 6 to 20 carbon atoms and at least one group chosen from the amide, ester, hydrazide, urea, carbamate and anhydride functional groups,
c) a compound of general formula (II):

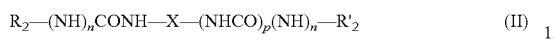

$$R_2—(NH)_nCONH—X—(NHCO)_p(NH)_n—R'_2 \quad (II)$$

wherein:
the $R_2$ and $R'_2$ groups, which are identical or different, represent a hydrocarbon chain comprising from 1 to 22 carbon atoms which is optionally substituted and which optionally comprises one or more heteroatoms, such as N, O or S, and $R_2$ can be H,
the X group represents a hydrocarbon chain comprising from 1 to 22 carbon atoms which is optionally substituted and which optionally comprises one or more heteroatoms, such as N, O or S, and
n and p are integers having a value of 0 or 1, independently of each other.

According to a favourite embodiment, the compound of general formula (I) is 2',3-bis[(3-[3,5-di(tert-butyl)-4-hydroxyphenyl]propionyl)]propionohydrazide.

According to a favourite embodiment, the compound of general formula (II) is chosen from compounds of general formula (IIA):

$$R_2—CONH—X—NHCO—R'_2 \quad (IIA)$$

wherein $R_2$, $R'_2$ and X are as defined above.

According to a favorite embodiment, the bituminous composition comprises from 0.1 to 10% by weight of one or several compounds of general formula (I), preferably from 0.4% to 5% by weight, more preferably from 0.4% to 1% by weight, with respect to the total weight of the bituminous composition.

According to a favorite embodiment, the bituminous composition comprises from 0.1% to 10% by weight of one or several compounds of general formula (II), preferably from 0.5% to 6% by weight, more preferably from 1% to 5% by weight, with respect to the total weight of the bituminous composition.

According to a favorite embodiment, the bitumen base has a penetrability at 25° C., measured according to standard EN 1426, lower than or equal to 200 1/10 mm, preferably lower than or equal to 100 1/10 mm.

According to a favorite embodiment, the bituminous composition has a penetrability at 25° C., measured according to standard EN 1426, lower than or equal to 40 1/10 mm, preferably from 5 to 40 1/10 mm, more preferably from 10 to 35 1/10 mm, even more preferably from 15 to 30 1/10 mm.

According to a favorite embodiment, the bituminous composition has a ring-and-ball softening point, measured according to standard EN 1427, of from 80 to 120° C., preferably from 90° C. to 115° C., more preferably from 95° C. to 110° C.

According to a favorite embodiment, the bituminous composition has a deformability at 65° C. lower than or equal to 50%, preferably lower than or equal to 25%, more preferably lower than or equal to 15%, even more preferably from 1 to 15%, and advantageously from 1 to 10%.

According to a favorite embodiment, the bituminous composition has a viscosity at 160° C., $V_{160}$, measured according to standard EN 13702, lower than or equal to 500 mPa·s, preferably from 50 to 500 mPa·s, more preferably from 100 to 250 mPa·s, even more preferably from 120 to 200 mPa·s, and advantageously from 125 to 175 mPa·s.

The invention is also directed to a process for the preparation of a bituminous composition, said process comprising contacting, at a temperature ranging from 70° C. to 220° C., the bitumen base with the compounds of general formula (I) and (II).

According to a favorite embodiment, the process comprises the following steps:
a) the introduction of the bitumen base in a reactor equipped with mixing means and its heating at a temperature ranging from 70° C. to 220° C., preferably from 90° C. to 180° C., more preferably from 110° C. to 180° C.,
b) the simultaneous or successive additions of the compounds of general formula (I) and (II), and
c) the mixture of the bituminous composition at a temperature ranging from 70° C. to 220° C., preferably from 90° C. to 180° C., more preferably from 110° C. to 180° C., until obtaining a homogenous composition.

DETAILED DESCRIPTION

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used herein, the term "consists essentially of" followed by one or more characteristics, means that may be included in the process or the material of the invention, besides explicitly listed components or steps, components or steps that do not materially affect the properties and characteristics of the invention.

The expression "comprised between X and Y" includes boundaries, unless explicitly stated otherwise. This expression means that the target range includes the X and Y values, and all values from X to Y.

Aspects of the present invention relates to a bitumen composition that may be subjected to an elevated ambient temperature, in particular a temperature ranging up to 100° C., preferably from 20° C. to 80° C.

In some exemplary embodiments, the bitumen is solid at ambient temperatures. By "solid at ambient temperature" it is meant that the bitumen composition is in a solid state and exhibits a solid appearance at ambient temperature, notably at elevated ambient temperature, whatever the conditions of transportation and/or of storage and/or of handling. More specifically, the bitumen composition retains its solid appearance throughout the transportation and/or storage and/or handling at ambient temperature, notably at elevated ambient temperature. The bitumen composition does not creep at ambient temperature, notably at elevated ambient temperature, under its own weight and does not creep when it is subjected to forces of pressures resulting from the conditions of transportation and/or of storage and/or of handling.

The term "penetrability" is understood here to mean the "needle penetrability" or "pen value" measurement, which is carried out by means of an NF EN 1426 standardized test at 25° C. (P25) and/or ASTM D5/D5M. This penetrability characteristic is expressed in tenths of a millimeter (dmm or $^{1}/_{10}$ mm). The needle penetrability, measured at 25° C., according to the NF EN 1426 standardized test, represents the measurement of the penetration into a bitumen sample, after a time of 5 seconds, of a needle, the weight of which with its support is 100 g. The standard NF EN 1426 replaces the equivalent standard NF T 66-004 of December 1986 with effect on Dec. 20, 1999 (decision of the Director General of AFNOR dated Nov. 20, 1999).

The term "softening point" is understood to mean the "ring-and-ball softening point" measurement which is carried out by means of an NF EN 1427 standardized test. The ring-and-ball softening point corresponds to the temperature at which a steel ball of standard diameter, after having passed through the material to be tested (stuck in a ring), reaches the bottom of a standardized tank filled with a liquid which is gradually heated and in which the apparatus has been immersed.

The invention firstly relates to a bituminous composition comprising at least:
a) a bitumen base,
b) a compound of general formula (I):

Ar1-R$_1$—Ar2   (I)

wherein:
Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more $C_1$-$C_{20}$ alkyl groups, and
R$_1$ represents an optionally substituted hydrocarbon divalent radical, the main chain of which comprises from 6 to 20 carbon atoms and at least one group chosen from the amide, ester, hydrazide, urea, carbamate and anhydride functional groups,
c) a compound of general formula (II):

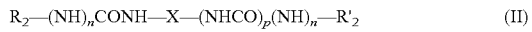

R$_2$—(NH)$_n$CONH—X—(NHCO)$_p$(NH)$_n$—R'$_2$   (II)

wherein:

the R$_2$ and R'$_2$ groups, which are identical or different, represent a hydrocarbon chain comprising from 1 to 22 carbon atoms which is optionally substituted and which optionally comprises one or more heteroatoms, such as N, O or S, and R$_2$ can be H,
the X group represents a hydrocarbon chain comprising from 1 to 22 carbon atoms which is optionally substituted and which optionally comprises one or more heteroatoms, such as N, O or S, and
n and p are integers having a value of 0 or 1, independently of each other.

The Bitumen Base

The term "bitumen" is understood to mean any bituminous composition composed of one or more bitumen bases and optionally comprising one or more additives.

Mention may first of all be made, among the bitumen bases which can be used according to the invention, of bitumens of natural origin, those present in natural bitumen or natural asphalt deposits or bituminous sands, and bitumens originating from the refining of crude oil.

Preferably, the bitumen bases are chosen from bitumen bases originating from the refining of crude oil or from bituminous sands, more preferably chosen from bitumen bases originating from the refining of crude oil.

The bitumen bases can be chosen from bitumen bases or mixtures of bitumen bases originating from the refining of crude oil, in particular bitumen bases containing asphaltenes or pitches. The bitumen bases can be obtained by conventional processes for the manufacture of bitumen bases in refining, in particular by direct distillation and/or vacuum distillation of oil. These bitumen bases can optionally be visbroken and/or deasphalted and/or air-rectified. It is standard to carry out the vacuum distillation of the atmospheric residues originating from the atmospheric distillation of crude oil. This manufacturing process consequently corresponds to the sequence of an atmospheric distillation and of a vacuum distillation, the feedstock supplying the vacuum distillation corresponding to the atmospheric distillation residues. These vacuum residues resulting from the vacuum distillation tower can also be used as bitumens. It is also standard to inject air into a feedstock generally composed of distillates and of heavy products originating from the vacuum distillation of atmospheric residues originating from the distillation of oil. This process makes it possible to obtain a blown or semi-blown or oxidized or air-rectified or partially air-rectified base. The various bitumen bases obtained by the refining processes can be combined with one another in order to obtain the best technical compromise. The bitumen base can also be a bitumen base from recycling.

Preferably, the bitumen bases are chosen from bitumen bases of hard or soft grade.

More preferably, the bitumen bases have a penetrability at 25° C., measured according to standard EN 1426, less than or equal to 200$^{1}/_{10}$ mm, advantageously less than or equal to 100$^{1}/_{10}$ mm.

According to the invention, for conventional processes for the manufacture of bitumen bases, the operation is carried out at manufacturing temperatures of between 100° C. and 200° C., preferably between 140° C. and 200° C., more preferably between 140° C. and 170° C. The bitumen composition is stirred for a period of time of at least 10 minutes, preferably of between 30 minutes and 10 hours, more preferably between 1 hour and 6 hours. The term "manufacturing temperature" is understood to mean the heating temperature of the bitumen base or bases before mixing and also the mixing temperature. The temperature and the duration of the heating vary according to the amount of bitumen used and are defined by the standard NF EN 12594.

According to some aspects of the invention, oxidized bitumens can be manufactured in a blowing unit by passing a stream of air and/or oxygen through a starting bituminous base. This operation can be carried out in the presence of an oxidation catalyst, for example phosphoric acid. Generally, the oxidation is carried out at elevated temperatures, of the order of 200 to 300° C., for relatively long periods of time typically of between 30 minutes and 2 hours, continuously or batchwise. The period of time and the temperature for oxidation are adjusted as a function of the properties targeted for the oxidized bitumen and as a function of the quality of the starting bitumen.

Advantageously, the bitumen bases are chosen from bitumens of natural origin; bitumens originating from bituminous sands; bitumens originating from the refining of crude oil such as the atmospheric distillation residues, the vacuum distillation residues, the visbroken residues, the semi-blown residues and their mixtures; and their combinations or from synthetic bitumens.

The invention is particularly remarkable for non-oxidized bitumen bases from which, in the absence of additives, it is impossible to obtain a bituminous composition suitable for roofing applications. In fact, the Applicant has discovered that the additivation of a non-oxidized bitumen base with both a compound of general formula (I) and a compound of general formula (II) allows obtaining a bituminous composition which is suitable for the preparation of a roofing shingle.

Non-oxidized bitumen bases typically have a ring and ball softening point, measured according to standard EN 1427, less than or equal to 70° C., more particularly less than or equal to 65° C.

Non-oxidized bitumen bases preferably have a Penetration Index (PI) value, also known as the Pfeiffer Index value, calculated according to the formula here-under, inferior or equal to 2.0.

$$PI = \frac{1952 - 500 \times \log(P_{25}) - 20 \times RBT}{50 \times \log(P_{25}) - RBT - 120}$$

According to some exemplary embodiment of the invention, the bitumen base may comprise at least one polymer additive and/or at least one fluxing agent.

In some exemplary embodiments, the polymer additive comprises an elastomeric radial or linear polymer. In some exemplary embodiments, the polymer additive comprises a copolymer such as a linear or radial copolymer.

In some advantageous embodiments the polymer additive comprises one or more of atactic polypropylene (APP), isotactic polypropylene (IPP), SB (styrene/butadiene) block copolymer, SBS (styrene/butadiene/styrene) block copolymer, SIS (styrene/isoprene/styrene) copolymers; polychloroprene; polynorbornene; chloroprene rubber (CR), natural and reclaimed rubbers, butadiene rubber (BR), acrylonitrile-butadiene rubber (NBR), isoprene rubber (IR), styrene-polyisoprene (SI), butyl rubber, ethylene propylene rubber (EPR), ethylene propylene diene monomer rubber (EPDM), polyisobutylene (PIB), SEBS (styrene/ethylene/butylene/styrene) copolymer; chlorinated polyethylenes (PE), polyethylene high-density (PEHD), and polypropylenes (PP), ethylene-vinyl acetate copolymers (EVA); ethylene-methylacrylate copolymers (EMA); copolymers of olefins and unsaturated carboxylic esters such as ethylene-butylacrylates (EBA); polyolefinic copolymers; polyolefins such as polybutenes (PB) and polyisobutenes (PIB); copolymers of ethylene and esters of acrylic acid or methacrylic acid or maleic anhydride; copolymers and terpolymers of ethylene and glycidyl methacrylate; ethylene/propylene copolymers; and rubber.

In other exemplary embodiments, the polymer additive comprises a linear polymer or a combination of linear and radial polymers. Examples of polymer modifiers are also disclosed in U.S. Pat. No. 4,738,884 to Algrim et al. and U.S. Pat. No. 3,770,559, to Jackson, the contents of which are incorporated herein by reference in their entirety. In some favorite embodiments, the asphalt is modified with styrene-butadiene rubber SBS.

Additional additives may also be included in the bitumen composition. Such additives include, for example vulcanization and/or crosslinking agents which are able to react with the polymer, notably with the elastomer and/or the plastomer, which may be functionalized and/or which may comprise reactive sites.

As vulcanization agents, mentions may be made by way of example of sulphur based vulcanization agents and its derivatives. Such vulcanization agents are generally introduced in a content of from 0.01% to 30% by weight, with respect to the weight of the elastomer.

As crosslinking agents, mentions may be made by way of example of cationic reticulation agents such as mono or polyacids; carboxylic anhydrides; esters of carboxylic acids; sulfonic, sulfuric, phosphoric or chloride acids; phenols. Such crosslinking agents are generally introduced in a content of from 0.01% to 30% by weight, with respect to the weight of the polymer. These agents are likely to react with the functionalized elastomer and/or plastomer. They may be used to complete and/or to substitute vulcanization agents.

Preferably, the bituminous composition according to the invention comprises from 80 to 99.8% by weight of one or several bitumen bases, more preferably from 89 to 99.1% by weight, and even more preferably from 94 to 98.6% by weight, with respect to the total weight of the bituminous composition.

Compounds of General Formula (I)

The bituminous composition according to the invention comprises at least one compound of general formula (I):

Ar1-R$_1$—Ar2     (I)

wherein:
Ar1 and Ar2 represent, independently of each other, an aromatic group comprising from 6 to 20 carbon atoms chosen among a benzene nucleus or a system of condensed aromatic nuclei, said aromatic group being substituted by at least one hydroxyl group and optionally by one or more C$_1$-C$_{20}$ alkyl groups, and
R$_1$ represents an optionally substituted hydrocarbon divalent radical, the main chain of which comprises from 6 to 20 carbon atoms and at least one group chosen from the amide, ester, hydrazide, urea, carbamate and anhydride functional groups, preferably chosen from hydrazide functional groups.

Preferably, Ar1 and/or Ar2 are substituted by at least one alkyl group comprising from 1 to 10 carbon atoms, advantageously in one or more ortho positions with respect to the hydroxyl group(s); more preferably Ar1 and Ar2 are 3,5-dialkyl-4-hydroxyphenyl groups, advantageously 3,5-di (tert-butyl)-4-hydroxyphenyl groups.

Preferably, R1 is in the para position with respect to a hydroxyl group of Ar1 and/or Ar2.

Advantageously, the compound of general formula (I) is 2',3-bis[(3-[3,5-di(tert-butyl)-4-hydroxyphenyl]propionyl)]propionohydrazide.

Preferably, the bituminous composition according to the invention comprises from 0.1 to 10% by weight of one of several compounds of general formula (I), with respect to the total weight of the bituminous composition.

More preferably, the bituminous composition according to the invention comprises at least 0.4% by weight of one or several compounds of general formula (I), with respect to the total weight of the bituminous composition Advantageously, the bituminous composition according to the invention comprises from 0.4 to 5% by weight of one or several compounds of general formula (I), more advantageously from 0.4 to 1% by weight, with respect to the total weight of the bituminous composition.

Compounds of General Formula (II)

The bituminous composition according to the invention comprises at least one compound of general formula (II):

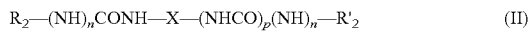

wherein:
the $R_2$ and $R'_2$ groups, which are identical or different, represent a saturated or unsaturated and linear, branched or cyclic hydrocarbon chain comprising from 1 to 22 carbon atoms which is optionally substituted by one or more hydroxyl groups or amine groups and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S, and $R_2'$ can be H;
the X group represents a saturated or unsaturated and linear, cyclic or branched hydrocarbon chain comprising from 1 to 22 carbon atoms which is optionally substituted and which optionally comprises heteroatoms, such as N, O or S, $C_5$-$C_{24}$ hydrocarbon rings and/or $C_4$-$C_{24}$ hydrocarbon heterocycles comprising one or more heteroatoms, such as N, O or S;
n and p are integers having a value of 0 or 1, independently of each other.

Preferably, the $R_2$ and/or $R'_2$ group comprises an aliphatic hydrocarbon chain of from 4 to 22 carbon atoms, in particular, chosen from the $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$ and $C_{22}H_{45}$ groups.

Preferably, the X group represents a saturated linear hydrocarbon chain comprising from 1 to 22 carbon atoms, more preferably from 1 to 12 carbon atoms, even more preferably from 1 to 10 carbon atoms, advantageously from 1 to 4 carbon atoms.

More preferably, the X group is chosen from the $C_2H_4$ and $C_3H_6$ groups.

Preferably, the compound of general formula (II) is chosen from those which satisfy the condition n=0.

Preferably, the compound of general formula (II) is chosen from those which satisfy the condition: the sum of the numbers of the carbon atoms of $R_2$, X and $R'_2$ is greater than or equal to 10, advantageously greater than or equal to 14, preferably greater than or equal to 18.

Preferably, the compound of general formula (II) is chosen from those which satisfy the condition: the number of the carbon atoms of at least one of $R_2$ and $R'_2$ is greater than or equal to 10, advantageously greater than or equal to 12, preferably greater than or equal to 14.

Preferably, the compound of general formula (II) is chosen from those of formula (IIA):

wherein $R_2$, $R'_2$, m and X have the same definitions as above.

Preferably, in the formula (IIA), the X group represents a saturated linear hydrocarbon chain comprising from 1 to 22 carbon atoms, more preferably from 1 to 12 carbon atoms and even more preferably from 1 to 4 carbon atoms. More preferably, the X group is chosen from the $C_2H_4$ and $C_3H_6$ groups.

Preferably, the compound of general formula (IIA) is chosen from those which satisfy the condition: the sum of the numbers of the carbon atoms of $R_2$, X and $R'_2$ is greater than or equal to 10, advantageously greater than or equal to 14, preferably greater than or equal to 18.

Preferably, the compound of general formula (IIA) is chosen from those which satisfy the condition: the number of the carbon atoms of at least one of $R_2$ and $R'_2$ is greater than or equal to 10, advantageously greater than or equal to 12, preferably greater than or equal to 14.

More preferably, the compound of general formula (IIA) is chosen from hydrazide derivatives, such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$ or $C_{21}H_{43}$—CONH—NHCO—$C_{21}H_{43}$; diamides, such as N,N'-ethylenedi(laurylamide) of formula $C_{11}H_{23}$—CONH—$CH_2$—$CH_2$—NHCO—$C_{11}H_{23}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$ or N,N'-ethylenedi(stearamide) of formula $C_{17}H_{35}$—CONH—$CH_2$—$CH_2$—NHCO—$C_{17}H_{35}$; monoamides, such as laurylamide of formula $C_{11}H_{23}$—$CONH_2$, myristylamide of formula $C_{13}H_{27}$—$CONH_2$, palmitamide of formula $C_{15}H_{31}$—$CONH_2$ or stearamide of formula $C_{17}H_{35}$—$CONH_2$.

More advantageously still, the compound of general formula (IIA) is N,N'-ethylenedi(stearamide) of formula $C_{17}H_{35}$—CONH—$CH_2$—$CH_2$—NHCO—$C_{17}H_{35}$.

Preferably, the bituminous composition according to the invention comprises from 0.1 to 10% by weight of one or several compounds of general formula (II), more preferably from 0.5 to 6% by weight, even more preferably from 1 to 5% by weight, with respect to the total weight of the bituminous composition.

The Bituminous Composition

Preferably, the bituminous composition according to the invention comprises, or better consists essentially of:
a) one or several bitumen bases,
b) one or several additives of general formula (I), and
c) one or several additives of general formula (II).

More preferably, the bituminous composition according to the invention comprises, preferably consists essentially of:
a) from 80 to 99.8% by weight of one or several bitumen bases,
b) from 0.1 to 10% by weight of one or several additives of general formula (I), and
c) from 0.1 to 10% by weight of one or several additives of general formula (II),
with respect to the total weight of the bituminous composition.

Advantageously, the bituminous composition according to the invention comprises, preferably consists essentially of:
a) from 89 to 99.1% by weight of one or several bitumen bases, b) from 0.4 to 5% by weight of one or several additives of general formula (I), and c) from 0.5 to 6% by weight of one or several additives of general formula (II), with respect to the total weight of the bituminous composition.

More advantageously, the bituminous composition according to the invention comprises, preferably consists essentially of:

a) from 94 to 98.6% by weight of one or several bitumen bases, b) from 0.4 to 1% by weight of one or several additives of general formula (I), and c) from 1 to 5% by weight of one or several additives of general formula (II), with respect to the total weight of the bituminous composition.

Preferably, the bituminous composition according to the invention has a penetrability at 25° C., measured according to standard EN 1426, less than or equal to 40 1/10 mm, more preferably from 5 to 40 1/10 mm, even more preferably from 10 to 35 1/10 mm, and advantageously from 15 to 30 1/10 mm.

Preferably, the bituminous composition according to the invention has a ring-and-ball softening point, measured according to standard EN 1427, of from 80 to 120° C., more preferably from 90° C. to 115° C., and even more preferably from 95° C. to 110° C.

Preferably, the bituminous composition according to the invention has a maximum force (Fmax) greater than or equal to 5 N, preferably greater than or equal to 10 N, more preferably greater than or equal to 20 N, even more preferably greater than or equal to 30 N, advantageously greater than or equal to 40 N, more advantageously greater than or equal to 50 N, even more advantageously greater than or equal to 60 N.

In some advantageous embodiments, the bituminous composition according to the invention has a maximum force of from 20 N to 200 N, more preferably from 30 N to 180 N, even more preferably from 40 N to 160 N, advantageously from 50 to 150 N, more advantageously from 60 to 100 N.

The maximum force (Fmax) may for example by measured with a texture analyzer commercialized by LLOYD Instruments under the name LF Plus and equipped with a thermal enclosure. The piston of the texture analyzer is cylinder having a diameter of 25 mm and a height of 60 mm.

A cylindrical metallic box comprising 60 g of the bituminous composition to analyze is introduced inside the thermal enclosure settled at a temperature of 50° C. The cylindrical piston is initially placed in contact with the superior surface of the bituminous composition. Then, the piston is put in a vertical movement to the bottom of the box, at a constant velocity equal to 1 mm/min and over a calibrated distance of 10 mm in order to apply to the superior surface of the bituminous composition a compression strength. The texture analyzer measures the maximal force (Fmax) applied by the piston on the surface of the bituminous composition at 50° C.

The determination of the maximal force (Fmax) allows evaluating the capacity of the bituminous composition to resist to the deformation, when it is submitted to a specific mass having a constant applied velocity. The higher the maximal force (Fmax) is, the better the compression strength a bituminous block obtained from the bituminous composition.

Preferably, the bituminous composition according to the invention has a deformability at 65° C., less than or equal to 50%, more preferably less than or equal to 25%, even more preferably less than or equal to 15%, and advantageously from 0.05 to 15%, and advantageously from 0.1 to 10%.

The deformability of a bituminous composition may for example be determined according to the following protocol.

The bituminous composition to be analyzed is first poured in a circular silicon mold and then cooled at ambient temperature for at least 1 hour before being unmolded.

The lower plate of an ANTON PAAR Physica MCR 301 plate-plate rheometer is heated at a temperature of 65° C. Once the temperature has been reached, the rheometer is equipped with a PP25 mobile before being blanked. The gap of the rheometer is fixed at 2 mm. The unmolded solid bituminous composition is placed on the heated plan. The height of the mobile is then adjusted to 2.1 mm and the surplus of bituminous composition overflowing under the mobile is cut out by using a heated spatula. The gap of the rheometer is finally re-adjusted at 2 mm and the bell, previously heated at 65° C., is placed over the whole instrument. The measurement is launched as soon as the rheometer indicates a normal force value equal to 0 N. The constraint applied to the sample is set at 100 Pa and the acquisition time at 7200 s.

Preferably, the bituminous composition according to the invention has a viscosity at 160° C., $V_{160}$, measured according to standard NF EN 13702, less than or equal to 500 mPa·s, more preferably from 50 to 500 mPa·s, even more preferably from 100 to 250 mPa·s, advantageously from 120 to 200 mPa·s, and more advantageously from 125 to 175 mPa·s.

Process for the Preparation of the Bituminous Composition According to the Invention The present invention also concerns a process for the preparation of a bituminous composition as defined above, said process comprising contacting, at a temperature of from 70° C. to 220° C., at least one bitumen base, at least one compound of general formula (I), at least one compound of general formula (II).

Compounds of general formula (I) and (II) may be added to the bitumen simultaneously or by successive additions.

Preferably, compounds of general formula (I) and (II) are contacted with the bitumen base at a temperature ranging from 90° C. to 180° C., more preferably from 110° C. to 180° C.

The bitumen base used in the above-defined process may be pure or additivated, notably with a polymer, in an anhydrous or emulsion form, or even in association with agglomerates in the form of a bituminous mix.

Advantageously, the process for the preparation of a bituminous composition comprises the following steps:

a) the introduction of the bitumen base in a reactor equipped with mixing means and its heating at a temperature ranging from 70° C. to 220° C., preferably from 90° C. to 180° C., more preferably from 110° C. to 180° C., b) the simultaneous or successive additions of the compounds of general formula (I) and (II), and c) the mixture of the bituminous composition at a temperature ranging from 70° C. to 220° C., preferably from 90° C. to 180° C., more preferably from 110° C. to 180° C., until obtaining a homogenous composition.

Applications

Another aspect of the present invention relates to the use of a bituminous composition according to the invention for different industrial applications, notably as binder or coating.

The bituminous composition according to the invention is particularly advantageous for the preparation of a sealing coating, an insulating coating, a roofing material, a membrane or an impregnation layer.

The bituminous composition according to the invention is particularly suitable for the preparation of a sealing coating, a noise barrier, an isolation membrane, a surface coating, a carpet tile, an impregnation layer or a roofing material.

More particularly, the bituminous composition according to the invention is suitable for the preparation of a roofing material, notably for the preparation of a roofing shingle.

Roofing Shingle Application

It was discovered that providing a non-oxidized bitumen base with at least one of a compound of general Formula (I) and at least one of a compound of general Formula (II) allows obtaining a bituminous composition which is suitable for the preparation of a roofing shingle. The bituminous composition according to the invention may be used as an asphalt shingle coating.

The shingle coating composition is then mixed with a filler, such as a filler of finely ground inorganic particulate matter, such as ground limestone, dolomite or silica, talc, sand, cellulosic materials, fiberglass, calcium carbonate, or combinations thereof. In some exemplary embodiments, the one or more fillers is included in at least 10 wt. %, based on the total weight of the shingle coating composition. In some exemplary embodiments, the one or more fillers are included in about 20 wt. % to about 90 wt. %, including about 25 wt. % to about 85 wt. %, about 50 wt. % to about 80 wt. % and about 65 wt. % to about 75 wt. %, based on the total weight of the shingle coating composition. In some exemplary embodiments, the one or more fillers are included in from 20 wt. % to 90 wt. %, including from 25 wt. % to 85 wt. %, from 50 wt. % to 80 wt. % and from 65 wt. % to 75 wt. %, based on the total weight of the shingle coating composition. In some exemplary embodiments, the shingle coating composition further comprises various oils, waxes, fire retardant materials, and other compounds conventionally added to asphalt compositions for roofing applications.

A process for the preparation of a roofing shingle from a bituminous composition according to the invention may generally comprise the following steps:

a) providing a base material sheet, b) coating the front and back of the base material sheet with a bituminous composition according to the invention, c) optionally, applying a backdust material to one side of the base material sheet, and d) optionally, applying at least on part of the surface of the bituminous (shingle) coating protective and/or decorative granules.

The step b) of coating as defined above may be realized according to any known method.

The process for the preparation of a roofing shingle as defined above may also comprise, between steps a) and b), an additional step of heating the bituminous composition according to the invention at a temperature ranging from 100° C. to 180° C., preferably from 120° C. to 160° C.

A roofing shingle which may be obtained from a bituminous composition according to the invention may typically comprises at least one sheet made of a bituminous composition according to the invention.

The base material sheet may be any type of base material sheet known for use in reinforcing bitumen-based roofing material, such as woven or non-woven textile materials.

Preferably, the base material sheet comprises a nonwoven web of glass fibers. Alternatively, the substrate may be a scrim or felt of fibrous materials such as mineral fibers, cellulose fibers, rag fibers, mixtures of mineral and synthetic fibers, or the like.

Advantageously, the bituminous composition according to the invention is directly coated on the surface on the base material sheet to form a bituminous sheet.

According to a variant, the roofing shingle further comprises, between the base material sheet and the bituminous sheet, at least one intermediary layer of another material.

The roofing shingle defined above may further comprise, at least on part of its surface, protective and/or decorative granules.

The bituminous composition according to the invention is advantageous in that it can be fully or partially recycled as road binder.

In particular, the bituminous composition according the invention is advantageous in that it permits the preparation of roofing shingles with an improved recyclability.

The various embodiments, alternative forms, preferences and advantages described above for each of the subject matters of the invention apply to all the subject matters of the invention and can be taken separately or in combination.

The invention is illustrated by the following non-limiting examples.

EXAMPLES

In the following examples, the percentages are indicated by weight, unless otherwise specified.

1. Material and Methods

The rheological and mechanical characteristics of the compositions to which reference is made in these examples are measured by the methods listed in Table 1.

TABLE 1

| Property | Abbreviation | Unit | Measurement standard |
|---|---|---|---|
| Needle penetrability at 25° C. | P25 | 1/10 mm | NF EN 1426 |
| Ring-and-ball softening temperature | RBT | ° C. | NF EN 1427 |
| Viscosity at 160° C. | $V_{160}$ | mPa · s | NF EN 13702 |
| Maximum Force | $F_{max}$ | N | detailed protocol here-after |
| Deformability at 65° C. | Def. | % | detailed protocol here-after |

Bitumen Base:

The bituminous base $B_0$ is an oxidized bitumen base having a penetrability $P_{25}$ of 16 1/10 mm, a Ring and Ball Softening temperature (RBT) of 95° C. The bitumen base $B_0$ is commercially available from OWENS CORNING under the name BURA Type 3.

The bitumen base $B_0$ is classically used for the preparation of asphalt shingles and constitutes in the following examples a comparative bitumen base (reference).

The bituminous compositions are prepared from the following non oxidized bitumen bases:

$B_1$: bitumen base of PG64-22 grade, having a penetrability $P_{25}$ of 59 1/10 mm, an RBT of 50° C.

$B_2$: bitumen base of PG70-12 grade, having a penetrability $P_{25}$ of 30 1/10 mm, an RBT of 53.8° C.

Chemical Additives:

Additive A1 of formula (I): 2',3-bis[(3-[3,5-di(tert-butyl)-4-hydroxyphenyl]propionyl)]propionohydrazide (CAS 32687-78-8), sold by BASF under the Irganox MD 1024 brand, Additive A2 of formula (II): N,N'-ethylenedi(stearamide), sold by Croda under the name Crodawax 140®.

Method for the Preparation of the Bituminous Compositions

The bitumen base was introduced into a reactor maintained at a temperature of 160° C. with stirring at 300 revolutions/min for two hours. The additives were subsequently introduced into the reactor. The contents of the reactor were maintained at 160° C. with stirring at 300 revolutions/min for 45 minutes.

Protocol for the Measurement of the Maximum Force ($F_{max}$)

The bituminous composition was tested to evaluate the compression strength of the composition submitted at a specific mass having a constant applied velocity. The compressive strength was evaluated by the measurement of the maximum force ($F_{max}$) applied on the surface of the bituminous composition without observing any deformation of the bituminous composition. The test was executed at a temperature of 50° C.

The maximum force ($F_{max}$) was measured with a texture analyzer commercialized by LLOYD Instruments under the name LF Plus and equipped with a thermal enclosure. The piston of the texture analyzer is a cylinder having a diameter of 25 mm and a height of 60 mm.

A cylindrical metallic box comprising 60 g of the bituminous composition was introduced inside the thermal enclosure settled at a temperature of 50° C. The cylindrical piston was initially placed in contact with the superior surface of the bituminous composition. Then, the piston was put in a vertical movement to the bottom of the box, at a constant velocity equal to 1 mm/min and over a calibrated distance of 10 mm in order to apply to the superior surface of the bituminous composition a compression strength. The texture analyzer measures the maximum force ($F_{max}$) applied by the piston on the surface of the bituminous composition at 50° C.

The determination of the maximum force ($F_{max}$) allows evaluating the capacity of the bituminous composition to resist to the deformation. The higher the maximal force ($F_{max}$), the better the compression strength of the bituminous composition.

Protocol for the Measurement of the Deformability (Def.)

The bituminous composition to be analyzed was first poured in a circular silicon mold and then cooled at ambient temperature for at least 1 hour before being unmolded.

The lower plate of an ANTON PAAR Physica MCR 301 plate-plate rheometer was heated at a temperature of 65° C. Once the temperature was reached, the rheometer was equipped with a PP25 mobile before being blanked. The gap of the rheometer is fixed at 2 mm. The unmolded solid bituminous composition was placed on the heated plate. The height of the mobile was then adjusted to 2.1 mm and the surplus of bituminous composition overflowing under the mobile was cut out by using a heated spatula. The gap of the rheometer was finally re-adjusted at 2 mm and the bell, previously heated at 65° C., was placed over the whole instrument. The measurement was launched as soon as the rheometer indicated a normal force value equal to 0 N. The constraint applied to the sample was set at 100 Pa and the acquisition time at 7200 s.

2. Preparation of the Compositions

The bituminous compositions $C_1$ to $C_7$ corresponding to the mixtures defined in the following Table 2 are prepared according to the above-described protocol.

Compositions $C_1$, $C_2$, $C_5$ and $C_6$ are according to the invention.

Compositions $C_3$, $C_4$, and $C_7$ are comparative.

TABLE 2

| Compositions | $B_1$ (%) | $B_2$ (%) | A1 (%) | A2 (%) |
|---|---|---|---|---|
| $C_1$ | 96.35% | — | 0.65% | 3% |
| $C_2$ | 98% | — | 1% | 1% |
| $C_3$ | 99.35% | — | 0.65% | — |
| $C_4$ | 97% | — | — | 3% |
| $C_5$ | — | 96.35% | 0.65% | 3% |
| $C_6$ | — | 97% | 1% | 2% |
| $C_7$ | — | 97% | — | 3% |

3. Rheological and Mechanical Properties of the Bitumen Compositions

The rheological and mechanical properties of the compositions $C_1$ to $C_7$ and of the bitumen bases $B_0$ to $B_2$ have been measured according to the above-defined protocols.

The results are given in the following Table 3.

TABLE 3

| | P25 (1/10 mm) | RBT (° C.) | Viscosity $V_{160}$ (mPa · s) | $F_{max}$ (N) | Def. (%) |
|---|---|---|---|---|---|
| $B_0$ | 16 | 95 | 4100 | 48.1 | 130.8 |
| $B_1$ | 59 | 50 | 155 | 0.8 | 456200 |
| $C_1$ | 29 | 101.5 | 146 | 68.3 | 4.6 |
| $C_2$ | 30 | 106 | 152 | 103 | 11 |
| $C_3$ | 45 | 98.5 | 157 | 48.5 | 256 |
| $C_4$ | 45 | 95.5 | 127 | 0.9 | 118.6 |
| $B_2$ | 30 | 53.8 | 193 | 1 | 254000 |
| $C_5$ | 23 | 98.5 | 157 | 80.7 | 4.8 |
| $C_6$ | 19 | 100 | 170 | 99.4 | 1.4 |
| $C_7$ | 22 | 94 | 160 | 2 | 289 |

Penetrability at 25° C.

Compositions $C_1$ to $C_4$ have a reduced penetrability as compared to the bitumen base $B_1$ non-specially additivated.

Compositions $C_5$ to $C_6$ have a reduced penetrability as compared to the bitumen base $B_2$ non-specially additivated.

The addition of at least one chemical additive $A_1$ and $A_2$ leads to a hardening of the bitumen base.

Ring-and-Ball Softening Temperature (RBT)

Compositions $C_1$ to $C_4$ have a significantly increased ring-and-ball softening temperature as compared to the bitumen base $B_1$.

Compositions $C_5$ to $C_7$ have an increased ring-and-ball softening temperature as compared to the bitumen base $B_2$.

In particular, compositions $C_1$ to $C_7$ have a ring-and-ball softening point superior or equal 90° C.

Thus, compositions $C_1$ to $C_7$ are suitable as bituminous compositions for the preparation of a roofing shingle.

The highest ring-and-ball temperatures are obtained for the compositions $C_1$, $C_2$, $C_5$ and $C_6$ according to the invention.

In particular, compositions $C_1$, $C_2$, $C_5$ and $C_6$ according to the invention have a ring-and-ball temperature which is superior to that of the oxidized bitumen $B_0$.

Viscosity

The additivation of the bitumen base $B_1$ or $B_2$ with at least one chemical additive A1 or A2 does not significantly affect the viscosity of the obtained bituminous composition.

Compositions $C_1$ to $C_8$ have an improved viscosity as compared to the oxidized bitumen base $B_0$. In particular, the viscosity at 160° C. of compositions $C_1$ to $C_8$ is more than 20 times inferior to the viscosity of the bitumen base $B_0$.

Maximum Force ($F_{max}$)

Compositions $C_1$, $C_2$, $C_5$ and $C_6$ according to the invention have a significantly higher maximum force value (between 68.3 and 103N) as compared to the bitumen bases $B_1$ and $B_2$ (respectively, 0.8 and 1N).

According to the results obtained for the compositions $C_4$ and $C_7$, we note that the additivation of the bitumen bases $B_1$ and $B_2$ with the chemical additive A2, taken alone, does not substantially modify their maximum force value.

Reversely, and according to the results obtained for the composition $C_3$, the additivation of the bitumen base $B_1$ with the chemical additive A1, taken alone, leads to an increase of the maximum force value.

The maximum force value of composition $C_1$, according to the invention, is significantly superior to the maximal force value of composition $C_3$ which solely comprises the additive $A_1$.

This demonstrates a synergy between the additives A1 and A2, which results in a surprising increase of the maximum force of the bituminous compositions comprising both additives.

Furthermore, compositions $C_1$, $C_2$, $C_5$ and $C_6$ according to the invention have an improved maximum force value as compared to the oxidized bitumen base $B_0$.

The improved maximal force value of the compositions according to the invention allows predicting an improved resistance strength of the compositions according to the invention as compared to compositions $C_3$, $C_4$, and $C_7$.

Asphalt shingles prepared from compositions according to the invention are thus stable during their storage. In particular, the obtained asphalt shingles have an improved creeping resistance as compared to the compositions of the prior art.

Deformability

According to the results obtained for the compositions $C_4$, and $C_7$, we note that the additivation of the bitumen bases $B_1$ and $B_2$ with the chemical additive A2, leads to a significant reduction of the deformability of the bitumen bases $B_1$ and $B_2$.

Similarly, and according to the results obtained for composition $C_3$, we note that the additivation of the bitumen base $B_1$ with the chemical additive A1, taken alone, leads to an even more significant reduction of the deformability of the bitumen base $B_1$.

Compositions $C_1$, $C_2$, $C_5$ and $C_6$ according to the invention have an even more significantly reduced deformability (between 1.4 and 11%) as compared to the bitumen bases $B_1$ and $B_2$ (respectively, 456 200 and 254 000%).

The combined addition of the additives A1 and A2 leads to a reduction of the deformability of the bitumen bases $B_1$ and $B_2$ which is superior to the reduction observed when only one of these two additives is added.

In addition, compositions $C_1$, $C_2$, $C_5$ and $C_6$, according to the invention, have a significantly reduced deformability as compared to the oxidized bitumen base $B_0$.

The compositions according to the invention are advantageous in that they are suitable for the preparation of asphalt shingles. In fact, compositions according to the invention have a very low penetrability (inferior to 30 1/10 mm) and a ring-and-ball softening point similar to that of an oxidized bitumen base classically used for the preparation of shingles.

Furthermore, the bituminous compositions according to the invention have improved physical properties as compared to an oxidized bitumen base. In particular, the bituminous compositions according to the invention have, compared to an oxidized bitumen base:

a reduced hot viscosity which facilitates the deposition of the asphalt coating on the substrate, and
an improved compression strength ($F_{max}$), and
a reduced deformability which both allow obtaining more durable asphalt shingles.

Asphalt shingles prepared from a bituminous composition according to the invention thus have an improved resistance to the deformations induced for example by temperature variations or by stress applied during setting up.

The invention claimed is:

1. A bituminous composition comprising at least:
   a) a bitumen base,
   b) 2',3-bis[(3-[3,5-di(tert-butyl)-4-hydroxyphenyl]propionyl)]propionohydrazide, and
   c) N,N'-ethylenedi(stearamide) of formula $C_{17}H_{35}$—CONH—$CH_2$—$CH_2$—NHCO—$C_{17}H_{35}$.

2. The bituminous composition as claimed in claim 1, comprising from 0.1 to 10% by weight of 2',3-bis[(3-[3,5-di(tert-butyl)-4-hydroxyphenyl]propionyl)]propionohydrazide with respect to the total weight of the bituminous composition.

3. The bituminous composition as claimed in claim 1, comprising from 0.1% to 10% by weight of N,N'-ethylenedi (stearamide) of formula $C_{17}H_{35}$—CONH—$CH_2$—$CH_2$—NHCO—$C_{17}H_{35}$ by weight, with respect to the total weight of the bituminous composition.

4. The bituminous composition as claimed in claim 1, comprising from 80 to 99.8% by weight of one or several bitumen bases, with respect to the total weight of the bituminous composition.

5. The bituminous composition as claimed in claim 1, comprising:
   a) from 80 to 99.8% by weight of one or several bitumen bases,
   b) from 0.1 to 10% by weight of 2',3-bis[(3-[3,5-di(tert-butyl)-4-hydroxyphenyl]propionyl)]propionohydrazide, and
   c) from 0.1 to 10% by weight of N,N'-ethylenedi(stearamide) of formula $C_{17}H_{35}$—CONH—$CH_2$—$CH_2$—NHCO—$C_{17}H_{35}$,
   with respect to the total weight of the bituminous composition.

6. The bituminous composition as claimed in claim 1, wherein the bitumen base has a penetrability at 25° C., measured according to standard EN 1426, lower than or equal to 200 1/10 mm.

7. The bituminous composition as claimed in claim 1, having a penetrability at 25° C., measured according to standard EN 1426, lower than or equal to 40 1/10 mm.

8. The bituminous composition as claimed in claim 1, having a ring-and-ball softening point, measured according to standard EN 1427, of from 80 to 120° C.

9. The bituminous composition as claimed in claim 1, having a deformability at 65° C. lower than or equal to 50%.

10. The bituminous composition as claimed in claim 1, having a viscosity at 160° C., V160, measured according to standard EN 13702, lower than or equal to 500 mPa·s.

11. A process for the preparation of a bituminous composition according to claim 1, said process comprising contacting, at a temperature ranging from 70° C. to 220° C., the bitumen base with 2',3-bis[(3-[3,5-di(tert-butyl)-4-hydroxyphenyl]propionyl)]propionohydrazide and N,N'-ethylenedi(stearamide) of formula $C_{17}H_{35}$—CONH—$CH_2$—$CH_2$—NHCO—$C_{17}H_{35}$.

12. The process according to claim 11, which comprises the following steps:
   a) the introduction of the bitumen base in a reactor equipped with mixing means and its heating at a temperature ranging from 70° C. to 220° C., b) the simultaneous or successive additions of 2',3-bis[(3-[3,5-di(tert-butyl)-4-hydroxyphenyl]propionyl)]propionohydrazide and N,N'-ethylenedi(stearamide) of formula $C_{17}H_{35}$—CONH—$CH_2$—$CH_2$—NHCO—$C_{17}H_{35}$, and
c) the mixture of the bituminous composition at a temperature ranging from 70° C. to 220° C., until obtaining a homogenous composition.

* * * * *